(12) United States Patent
Knott

(10) Patent No.: US 8,466,667 B2
(45) Date of Patent: Jun. 18, 2013

(54) CONTROLLABLE CIRCUIT

(75) Inventor: Arnold Knott, Hunderdorf (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 99 days.

(21) Appl. No.: 12/262,891

(22) Filed: Oct. 31, 2008

(65) Prior Publication Data

US 2010/0039084 A1   Feb. 18, 2010

(30) Foreign Application Priority Data

Oct. 31, 2007   (EP) ..................................... 07021329

(51) Int. Cl.
  *G05F 1/00*   (2006.01)
(52) U.S. Cl.
  USPC .......................................... 323/282; 323/283
(58) Field of Classification Search
  USPC ................. 323/222, 223, 271, 280, 282, 283, 323/284
  See application file for complete search history.

(56) References Cited

U.S. PATENT DOCUMENTS

| | | | |
|---|---|---|---|
| 7,741,827 B2 * | 6/2010 | Allinder et al. ............... | 323/288 |
| 2003/0034760 A1 * | 2/2003 | Hwang ......................... | 323/224 |
| 2003/0103361 A1 | 6/2003 | Krein | |
| 2007/0013356 A1 * | 1/2007 | Qiu et al. ..................... | 323/288 |
| 2007/0018627 A1 * | 1/2007 | Chen ............................ | 323/283 |
| 2007/0075687 A1 * | 4/2007 | Ishii et al. ..................... | 323/225 |
| 2007/0176660 A1 | 8/2007 | Anderson | |
| 2009/0201003 A1 * | 8/2009 | Kobori et al. ................. | 323/284 |

FOREIGN PATENT DOCUMENTS

JP    2007097389    4/2007

* cited by examiner

*Primary Examiner* — Nguyen Tran
(74) *Attorney, Agent, or Firm* — O'Shea Getz P.C.

(57) ABSTRACT

A switch-mode power circuit comprises a controllable element and a control unit. The controllable element is configured to control a current in response to a control signal supplied to the controllable element. The control unit is connected to the controllable element and provides the control signal. The control unit comprises a first signal processing unit, a second signal processing unit, and a combiner unit. The first signal processing unit has an output and is supplied with a first carrier signal and an input signal. The second signal processing unit has an output and is supplied with a second carrier signal and the input signal. The combiner unit is connected to the first and second signal processing units combining the outputs of the first and the second signal processing units to form a signal representative of the control signal.

14 Claims, 21 Drawing Sheets

OR

| in$_1$ | in$_2$ | out |
|---|---|---|
| 0 | 0 | 0 |
| 0 | 1 | 1 |
| 1 | 0 | 1 |
| 1 | 1 | 1 |

Mean Value = 75% Ones

AND

| in$_1$ | in$_2$ | out |
|---|---|---|
| 0 | 0 | 0 |
| 0 | 1 | 0 |
| 1 | 0 | 0 |
| 1 | 1 | 1 |

Mean Value = 25% Ones

Single Tone Spectrum
on Logarithmic Scale
$X = 0.6 \cdot \sin(2 \cdot \pi \cdot 1 \text{ Hz} \cdot t)$ Two Tone Spectrum
on Logarithmic Scale
$X = 0.35 \cdot \sin(2 \cdot \pi \cdot 1 \text{ Hz} \cdot t)$
$+ 0.45 \cdot \sin(2 \cdot \pi \cdot 4 \text{ Hz} \cdot t)$ Single Tone Spectrum on Logarithmic Scale $x = 0.6 \cdot \sin(2 \cdot \pi \cdot 1 \text{ Hz} \cdot t)$ Two Tone Spectrum on Logarithmic Scale $x = 0.35 \cdot \sin(2 \cdot \pi \cdot 1 \text{ Hz} \cdot t)$
$+ 0.45 \cdot \sin(2 \cdot \pi \cdot 4 \text{ Hz} \cdot t)$

CONTROLLABLE CIRCUIT

CLAIM OF PRIORITY

This patent application claims priority to European Patent Application serial number 07 021 329.3 filed on Oct. 31, 2007.

FIELD OF THE INVENTION

This invention relates to control circuits, and in particular to switch-mode power circuits.

RELATED ART

Switch-mode power circuits generate a broad band spectrum due to their high speed signals. Such broad band spectral components can disturb other electronic equipment like receivers used in communication systems. Approaches to lower high frequency signal contents in switch-mode power circuits lead to extensive filter components and shielding. The filter components are bulky, expensive and dissipative due to the need to be designed for high voltage and current levels. The implementation of shielding is difficult as the mechanical efforts need to be combined with electrical isolation due to different electrical potentials on various conductive elements of power components. Consequently, compromises are made between good thermal design and good electrical design.

There is a general need to improve switching power circuits for the reasons outlined above.

SUMMARY OF THE INVENTION

A switch-mode power circuit comprises a controllable element and a control unit. The controllable element controls a current in response to a control signal provided by the control unit. The control unit comprises a first signal processing unit, a second signal processing unit, and a combiner unit. The first signal processing unit has an output and is supplied with a first carrier signal and an input signal. The second signal processing unit has an output and is supplied with a second carrier signal and the input signal. The combiner unit is connected to the first and second signal processing units combining the outputs of the first and the second signal processing units to form a signal representative of the control signal.

DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
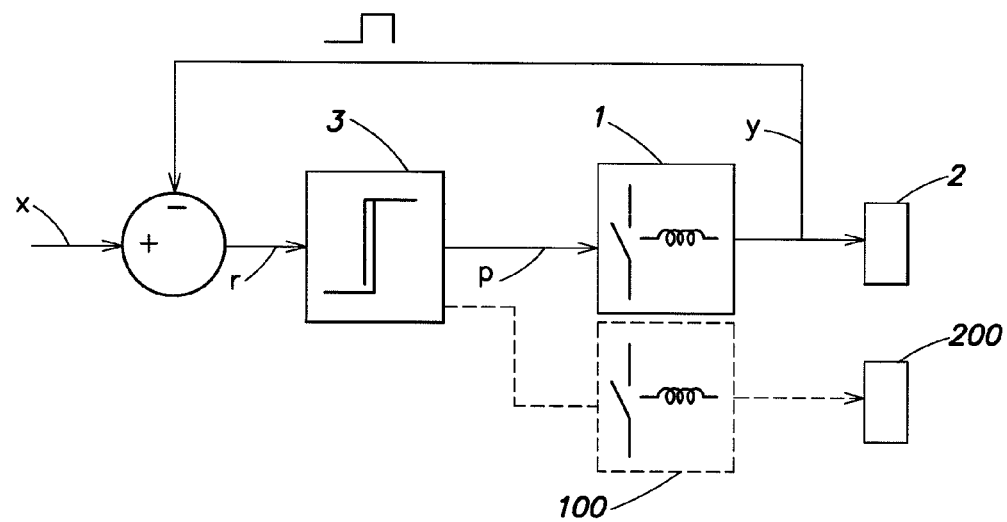
FIG. 1 is a block diagram illustration of a switch-mode power circuit.

FIG. 1 is a block diagram illustration of an example of a switch-mode power circuit comprising, as a controllable element, a controllable switch 1 that switches a current through a load 2 dependant on a control signal p supplied to the switch 1 by a control unit 3 connected to the switch 1. The switch 1 may be, for example, a transistor such as a bipolar transistor, a MOS field effect transistor or other suitable transistors. In other examples, the control signal and an inverted control signal may control an array of switches 1, 100, for example, configured in a half bridge or a full bridge arrangement. The load 2, for example, may be a coil of a switched power supply, a voice coil of a loudspeaker, an ohmic load provided by a heating element, or other suitable switch-mode power circuits. The control unit 3, for example, comprises, as a signal processing unit, a modulator arrangement. In one example, the modulator arrangement is configured as a frequency or pulse width modulator arrangement providing a signal p whose frequency or pulse width is dependant on a modulation signal r. The modulation signal r, supplied to the control unit 3, forms an input signal illustrated in equation 1:

$$r = a(y-x)$$

where x is a modulation signal and y is a rectangular signal that is supplied to the load 2 and forms a carrier signal clocking the switch-mode power circuit. In other examples, the signal p or the inverted signal p is also supplied to the at least one additional switch 100 switching a load 200. In a further example, where the switches 1,100 are configured in a bridge circuit, the switch 100 may also switch the load 2.

Conventional switch power circuits comprise modulator arrangements that use no carrier or only one carrier signal to be, for example, frequency modulated or pulse width modulated (PWM). These conventional switch power circuits create high frequency (HF) bands at multiples of the carrier frequency and their sidebands. Whereas, the disclosed arrangements use at least two carriers with different frequencies resulting in multiple HF bands, which in some examples may overlap. Such modulator arrangements are referred to as multi-carrier modulators (MCM) in the following description. The carriers are fed into different modulators and combined with a reference signal r. To drive a power switch, for example a transistor, the outputs of the several modulators are combined into a resulting bit stream. Examples of combinations of two or more modulators and their attributes are described below, whereby comparators serve as modulators. In examples having more than two modulators, the AND or OR gates may have more than two inputs.

A simple decision rule may be an OR operation or an AND operation of the comparator outputs. In one example, the rules that determine whether the output of the modulator arrangement is low or high in the time domain are illustrated in equation 2 as follows:

$$p=1 \text{ if } r<car1 \text{ or } r<car2$$

$$p=0 \text{ else}$$

$$p=1 \text{ if } r<car1 \text{ \& } r<car2$$

$$p=0 \text{ else}$$

where p is the bit-stream output, r is the reference signal and car1 and car2 are the two carrier signals. However, the arrangement is not limited to two carriers. In other examples, the directions of the inequality can be changed, resulting in a phase shift of 180°.

Figure 2:
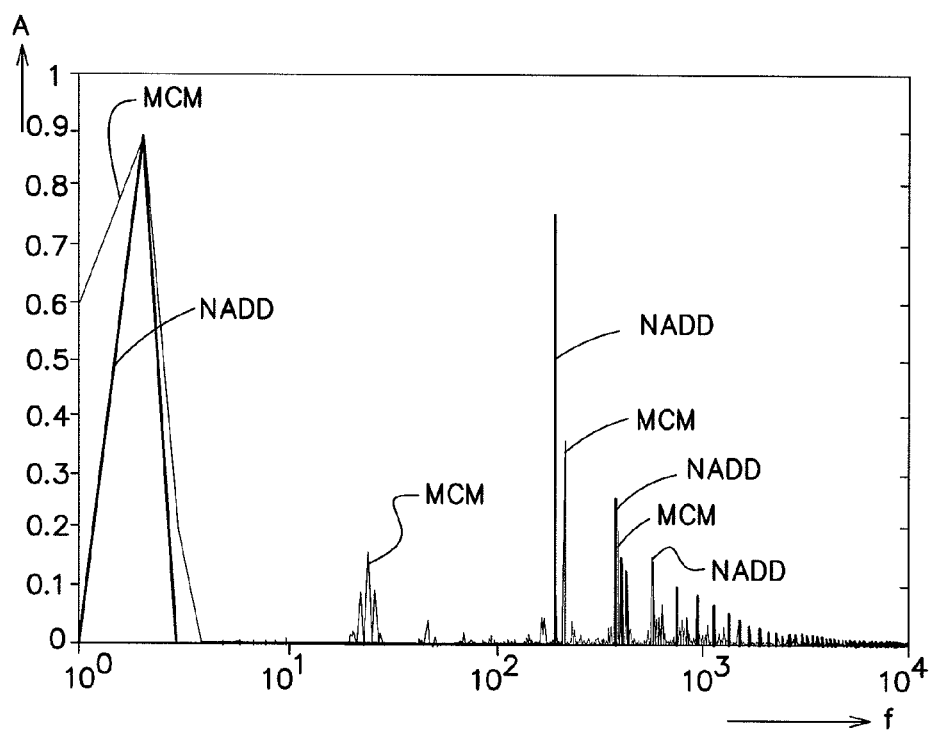
FIG. 2 is a diagram showing a comparison between a single carrier modulated signal and a multi carrier modulated signal.

FIG. 2 is a diagram illustrating a comparison between a single carrier modulated signal and a multi carrier modulated signal combined with an OR. The modulation signal, for example at a frequency f of 2 Hz, maintains its full amplitude A while the carriers and its sidebands have an amplitude half of A when using multi-carrier modulation (MCM) such as an ORed (i.e., combined by an OR operation) multi carrier modulation instead of a single-carrier modulation such as, for example, a known natural sampled, double side modulated pulse width modulation (NADD). In this example, the ORed MCM has twice as many peaks as the NADD. The intermodulation between the two carriers and their side bands define an additional spectral component. In some examples, the intermodulation is beneficial because energy may be put into a band where communication systems available in the market do not operate, for example, basebands of cellular phones have cut-off frequencies below this frequency range. The utilization of this out-of-band intermodulation (OIM) band can be adjusted by the distance of the two carriers in frequency and/or the bandwidth around them.

Figure 3:
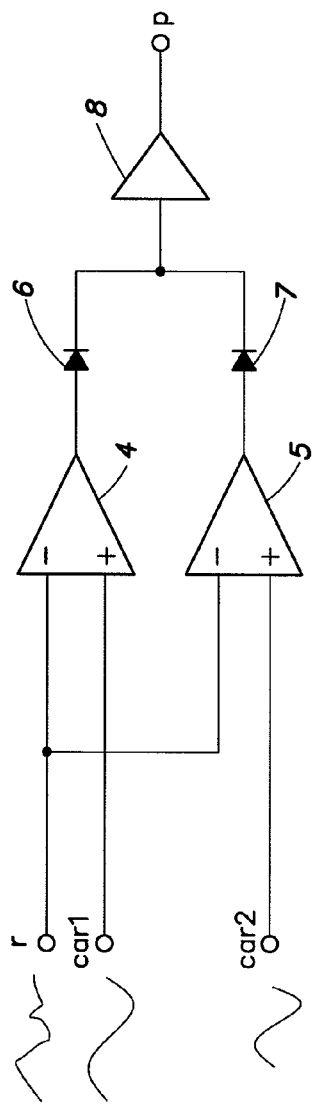
FIG. 3 is a block diagram illustration of an ORed multi carrier modulator arrangement.

FIG. 3 is a block diagram illustration of an example of an ORed MCM arrangement using comparators 4, 5 as modulators and standard diodes 6, 7 operated as wired OR gates. The comparators 4, 5 each have two inputs and an output, where the inputs of each comparator are supplied with the reference signal r and one of the carrier signals car1, car2, respectively. The signal r may have any kind of waveform and signals car1, car2 may be, for example, sinusoidal signals. The outputs are OR wired by diodes 6, 7 such that the cathodes of the diodes 6, 7 are connected together forming an output for the control signal p. The example in FIG. 4 differs from the example in FIG. 3 in that the diodes 6, 7 have opposite polarities (i.e., the anodes are connected together forming an AND gate) and that the carrier signals car1, car2 have a triangular waveform. Where, in the examples in FIGS. 3 and 4, the voltage drop across the diodes 6, 7 is disadvantageous, the signal can be retriggered with a driver 8 (e.g., a Schmitt trigger, inverter, comparator, amplifier, etc.) connected downstream of the OR gate or the AND gate established by diodes 6 and 7. Pull-up or pull-down resistors, after the diode logic, may be applied dependent on the input attributes of the following stage.

Figure 4:
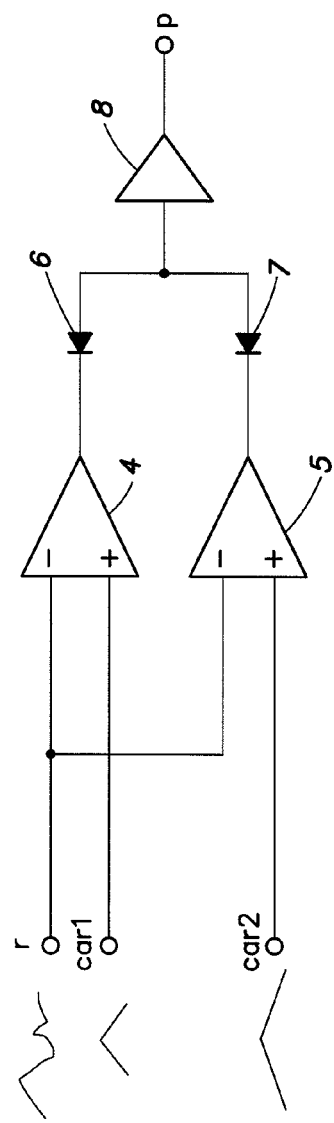
FIG. 4 is a block diagram illustration of an ANDed multi carrier modulator arrangement.
Figure 5:
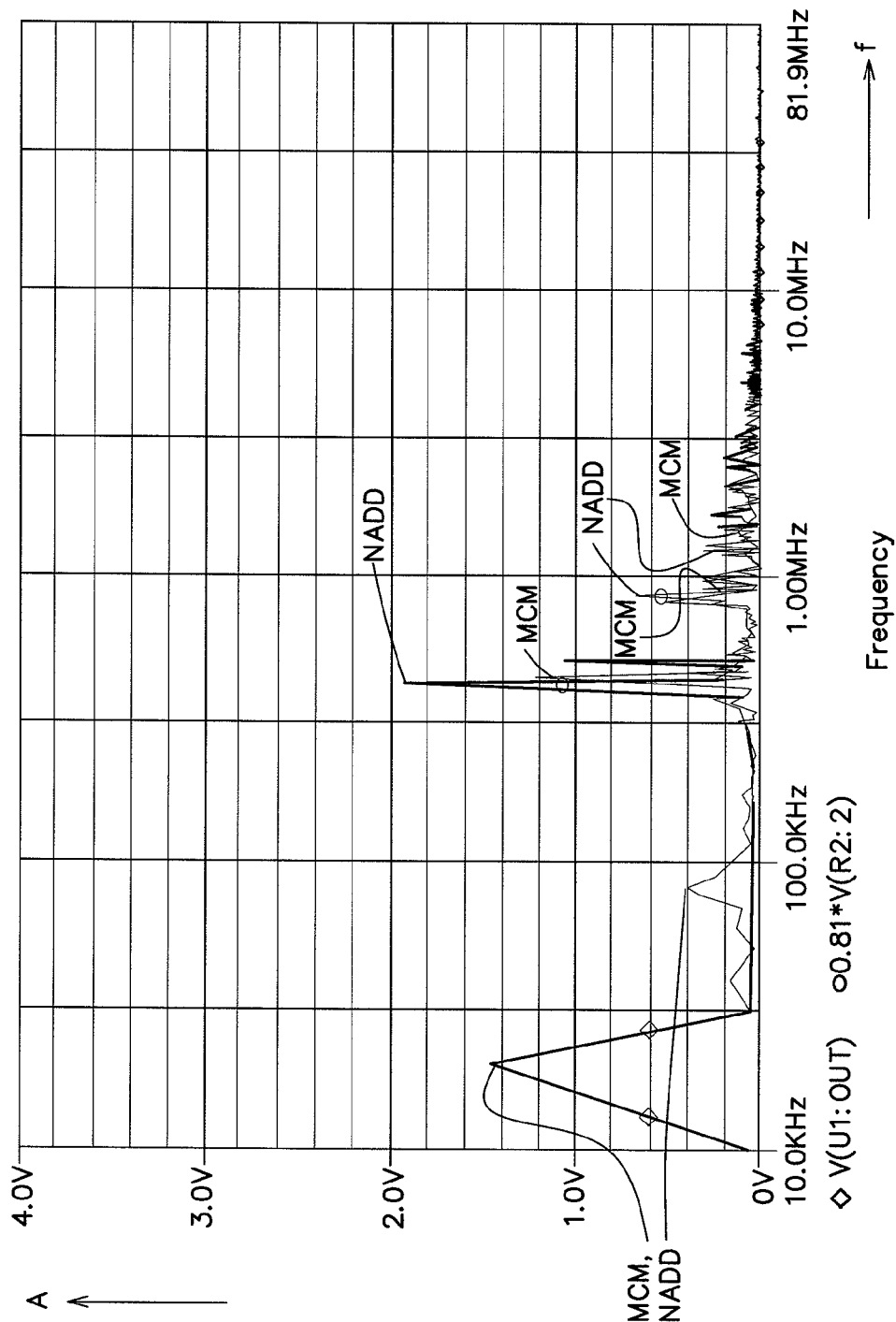
FIG. 5 shows simulation results of ORed MCM with two carriers.

FIG. 5 illustrates the results of a simulation using models of the particular physical components which match the calculation results illustrated in FIG. 2. The signal was retriggered in this simulation as shown in FIGS. 3 and 4. The ORed and the ANDed MCMs may be extended to N carriers, where N is an integer number. For each additional carrier, the peaks of the fundamentals are lowered by a=1/N, while the number of peaks increase by N.

Figure 6:
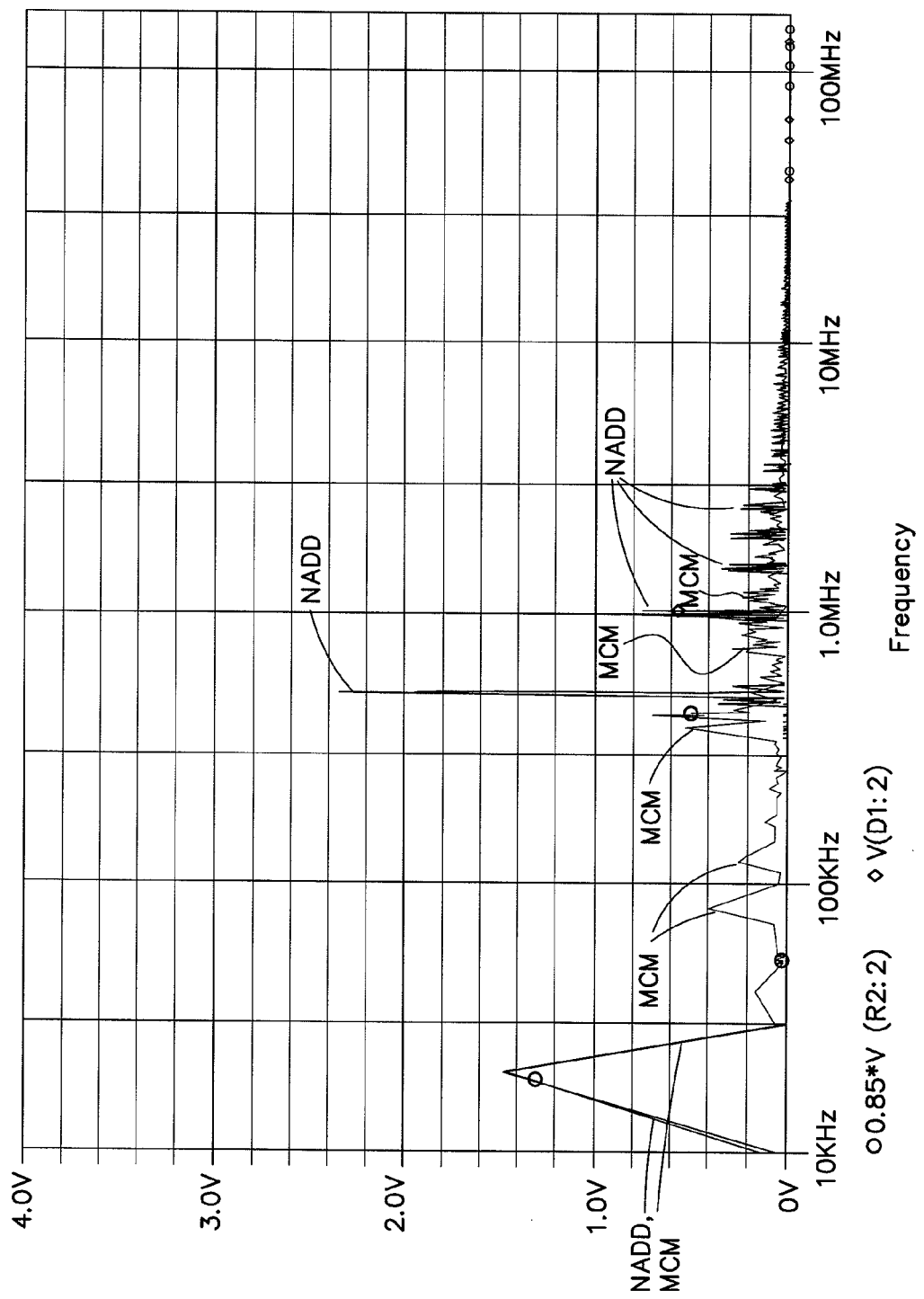
FIG. 6 shows simulation results of ORed MCM with three carriers.
Figure 7:
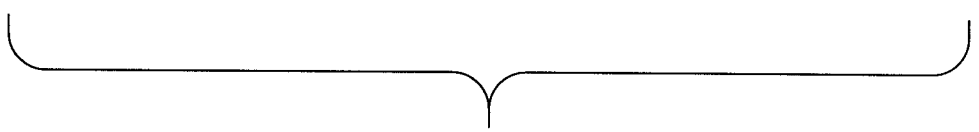
FIG. 7 shows the statistical distribution of ones and zeros in OR and AND operations.

FIG. 6 illustrates the behaviour of an example of a switch-mode power circuit when increasing the number of carriers to three. Both ANDed and ORed MCMs generate a direct current (DC) offset. The offset results from the statistical distribution of highs and lows in the two logical operations shown in the truth tables in FIG. 7. In the present example, a XOR logic operation has a 50% occurrence resulting in no DC offset. However, the XOR has 50% redundancy in its truth table due to its symmetry, where the symmetry results in a doubling of the frequency of the modulation signal at the output. This is for some applications less desirable. Both, ANDing and ORing MCMs have an adequate amount of second order total harmonic distortion (THD2nd). These modulator topologies are adequate, due to low complexity, for power supplies with low line and load regulation demands. Amplifiers with low distortion demands and high EMI requirements may also benefit from these modulation schemes.

Figure 8A:
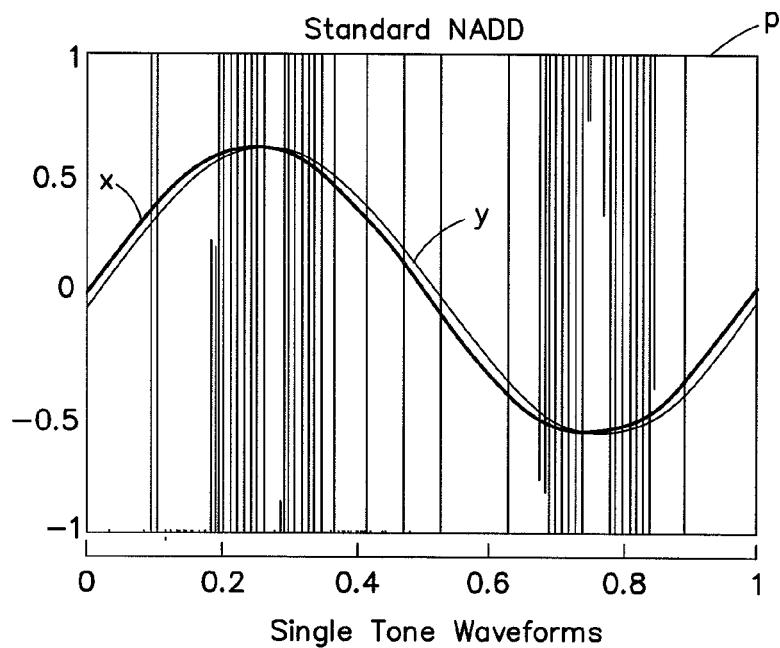
FIGS. 8A-8F show waveforms and spectra of a known single carrier modulation.
Figure 8B:
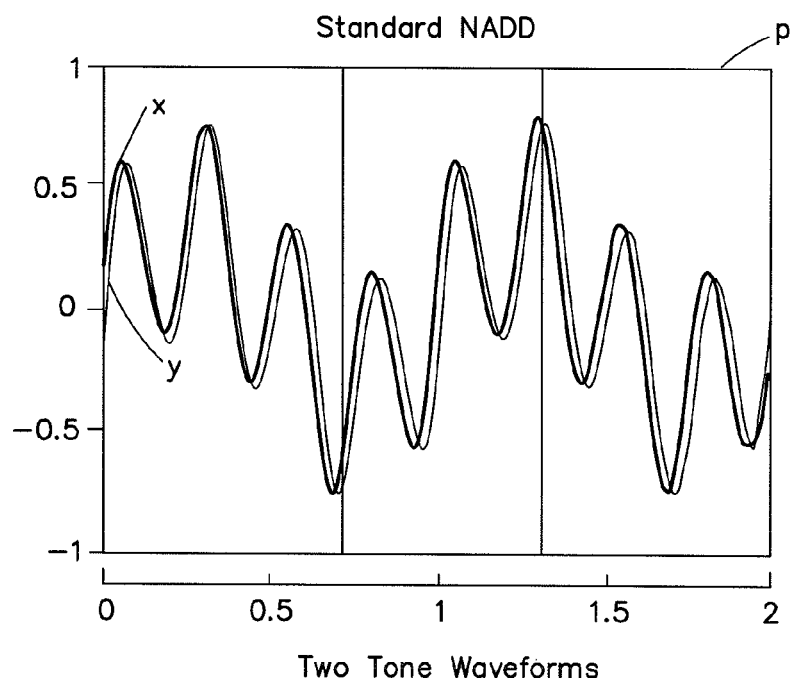
Figure 8C:
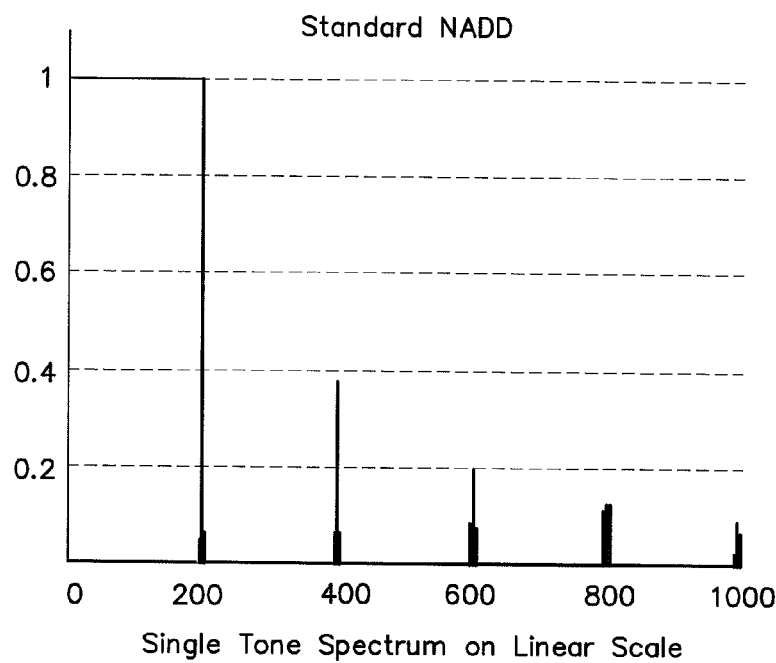
Figure 8D:
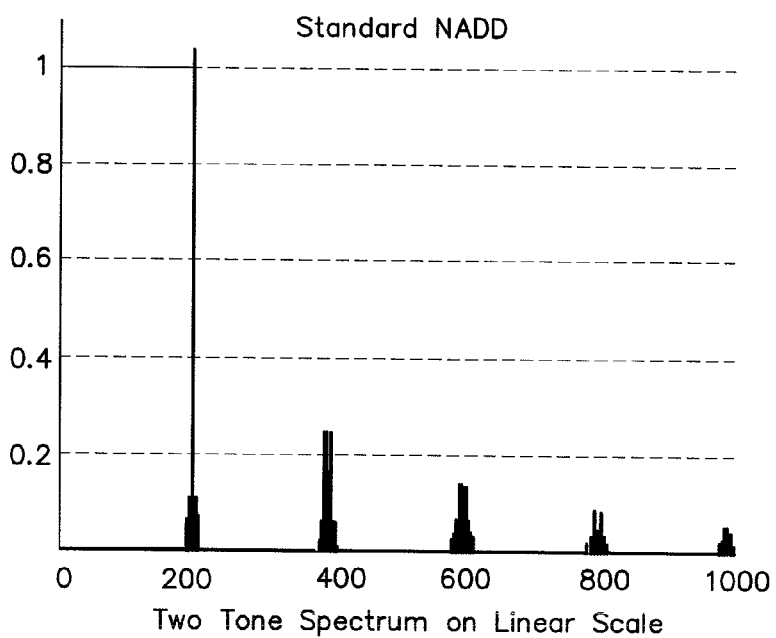
Figure 8E:
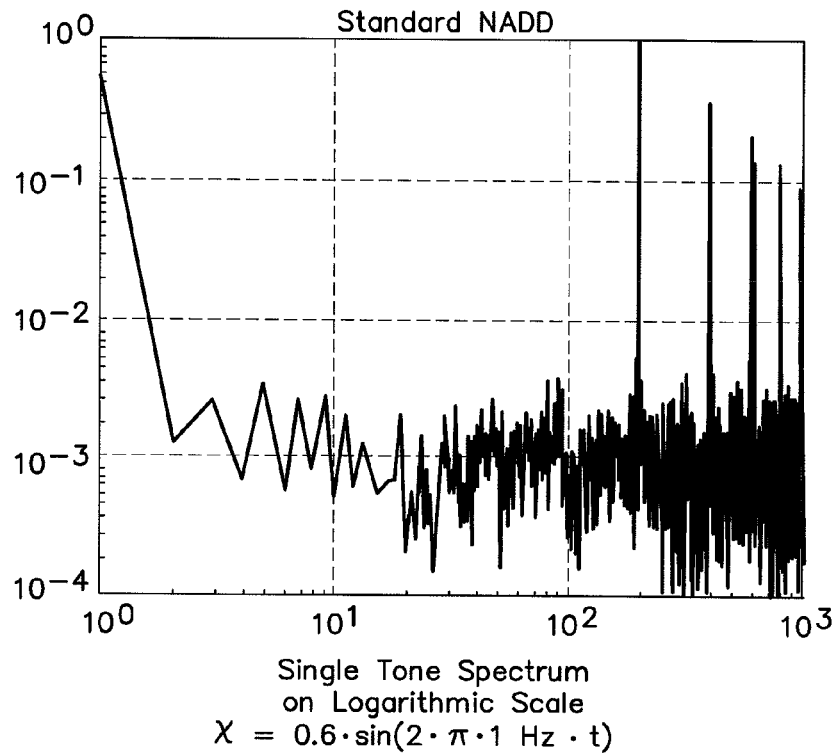
Figure 8F:
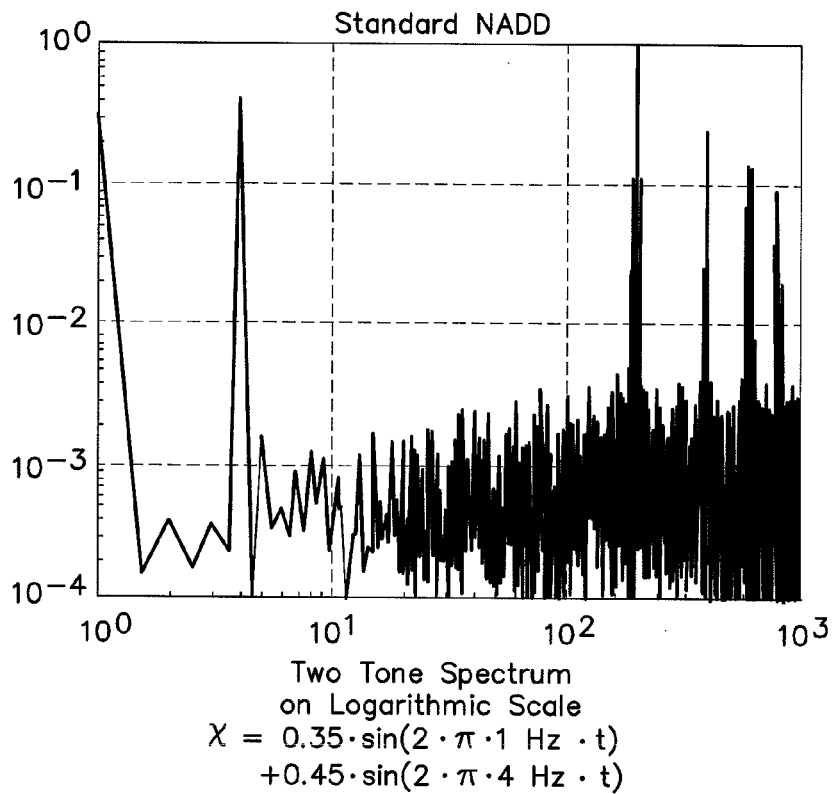
Figure 9A:
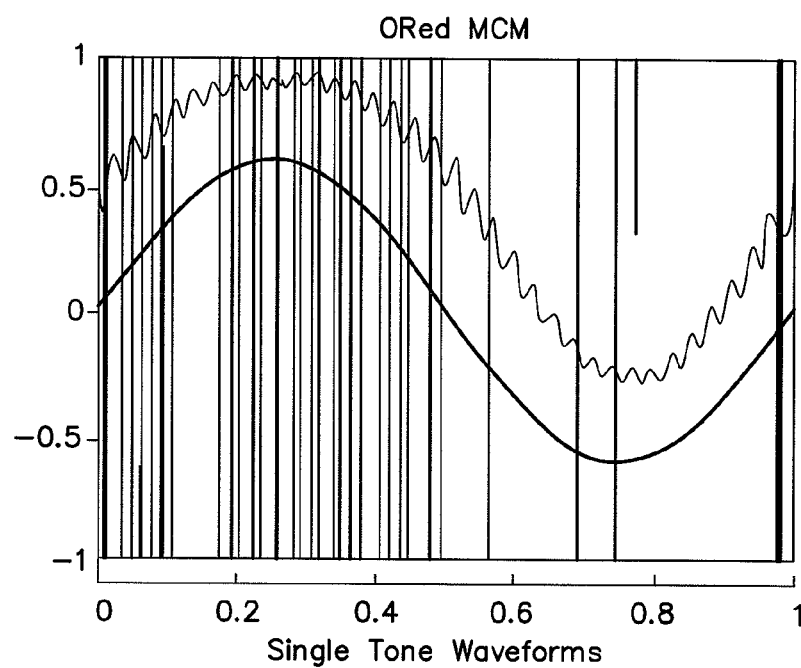
FIG. 9 shows waveforms and spectra of an ORed multi carrier modulation.
Figure 9B:
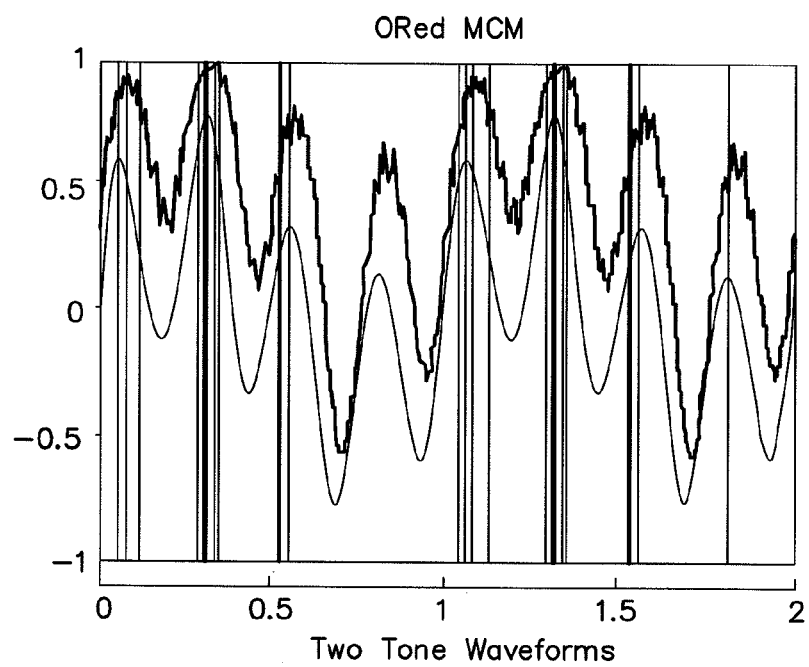
Figure 9C:
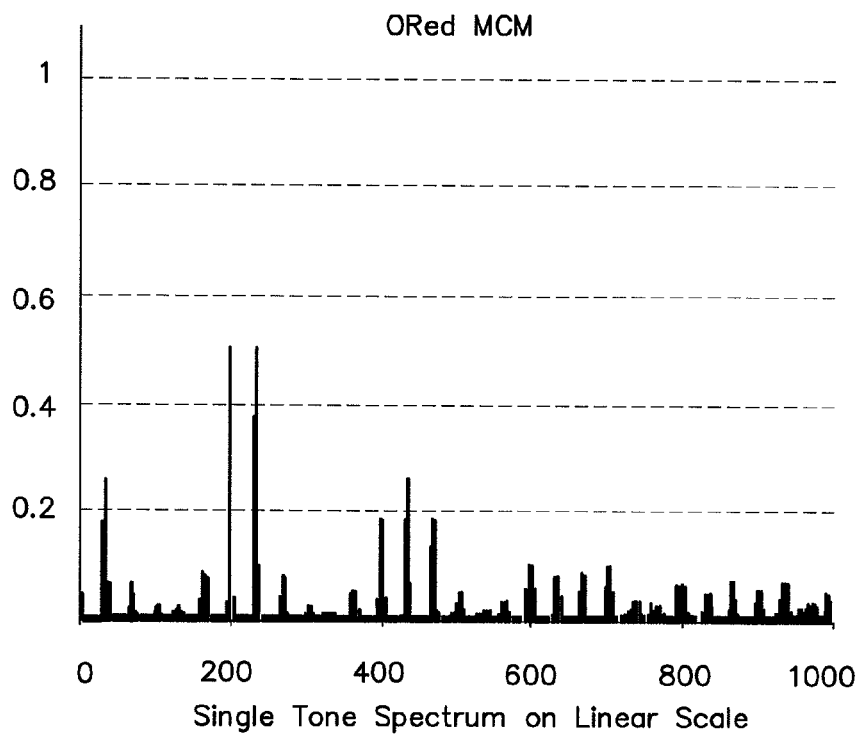
Figure 9D:
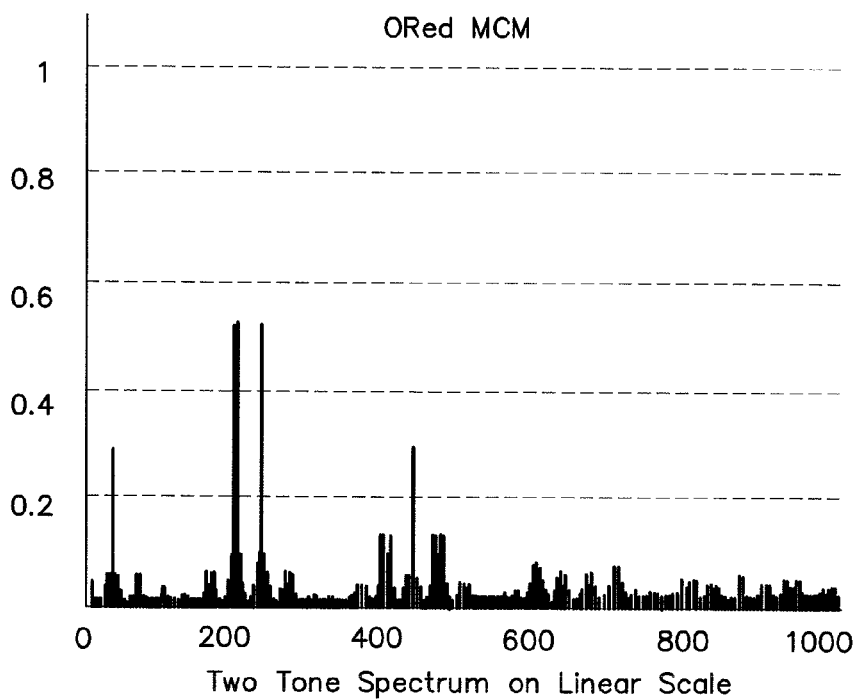
Figure 9E:
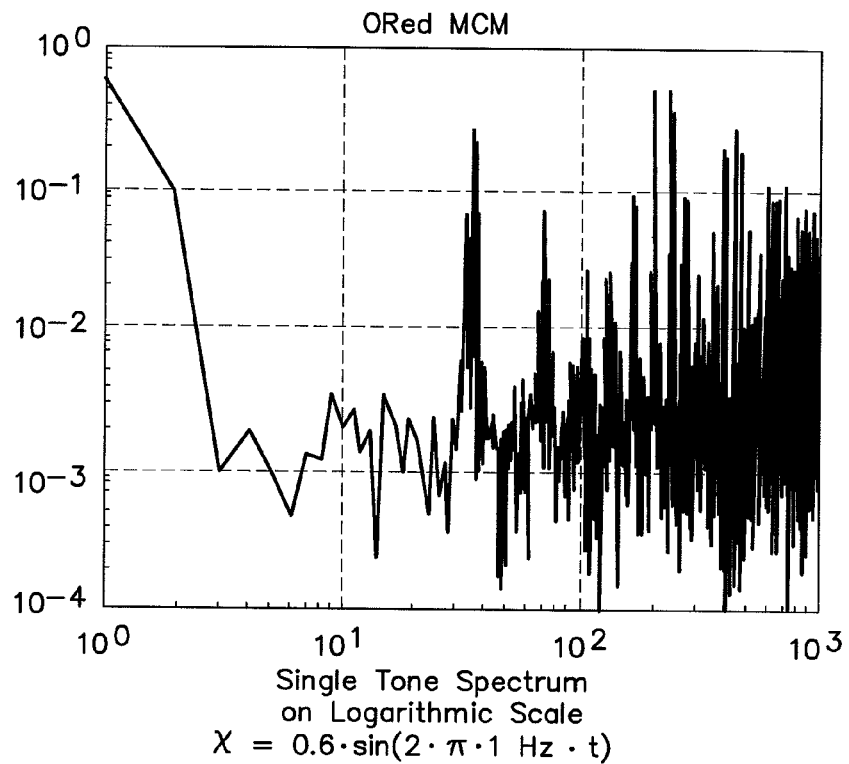
Figure 9F:
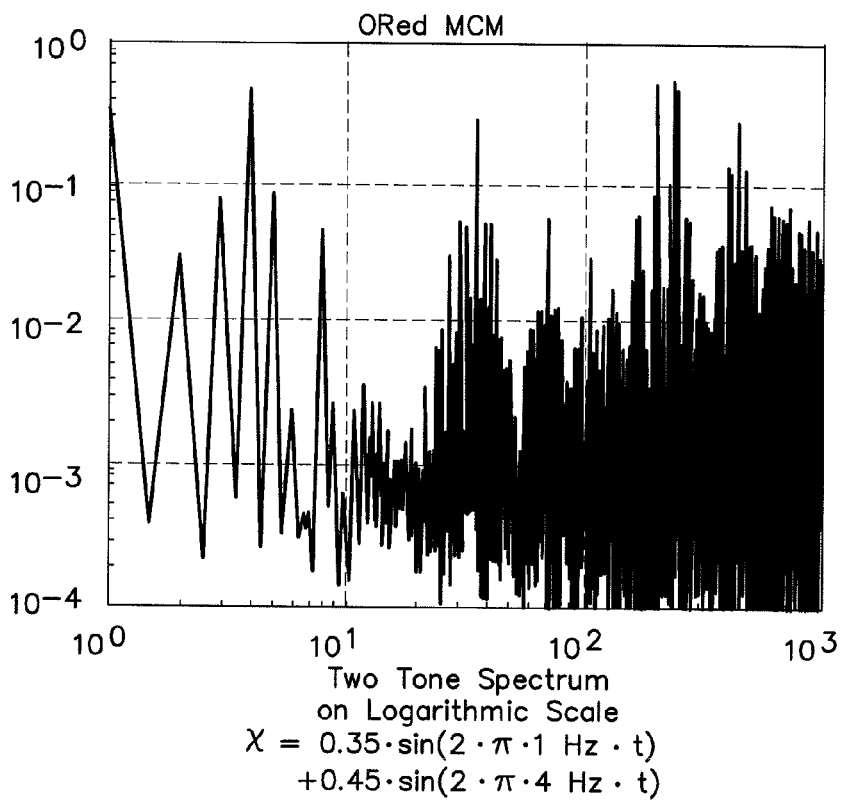
Figure 10A:
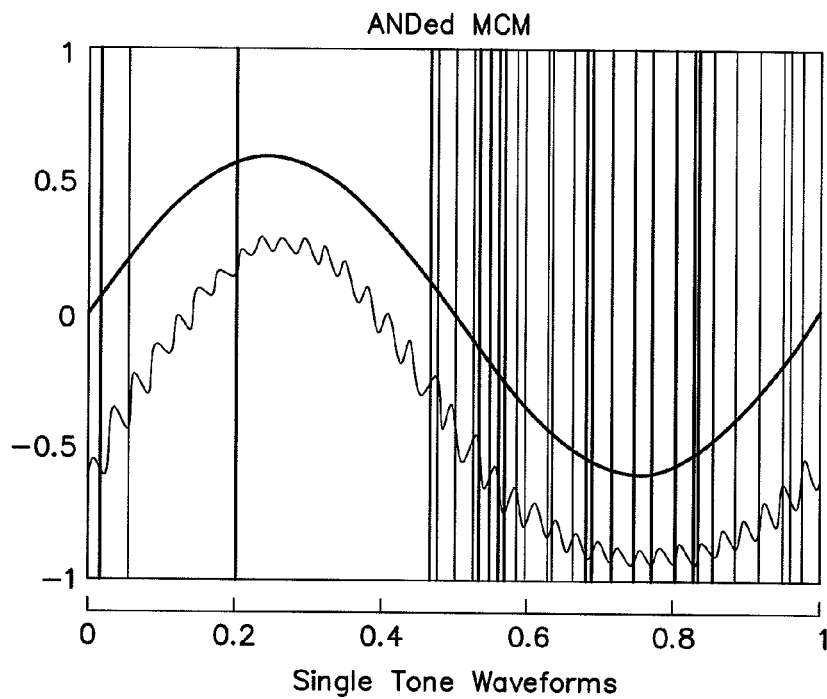
FIG. 10 shows waveforms and spectra of an ANDed multi carrier modulation.
Figure 10B:
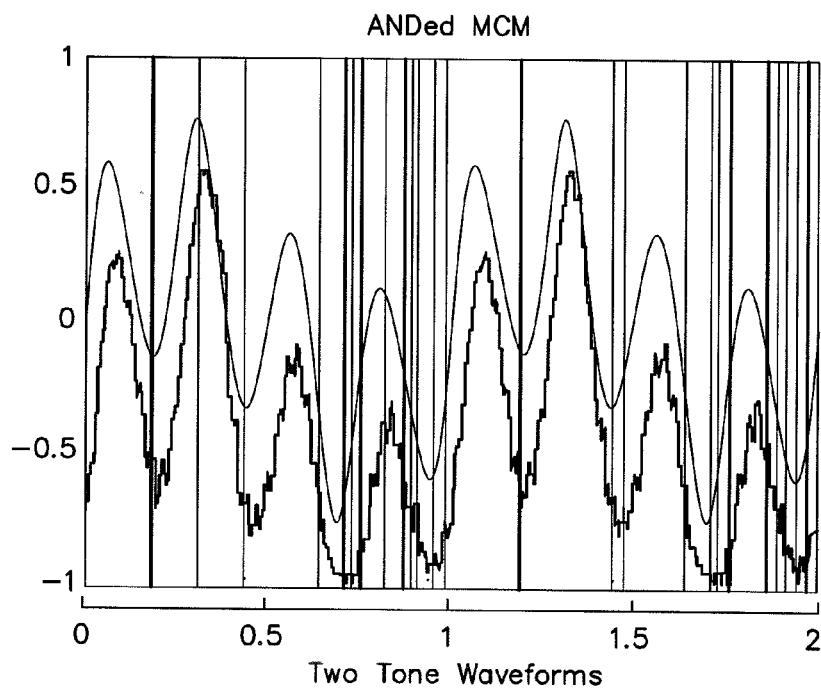
Figure 10C:
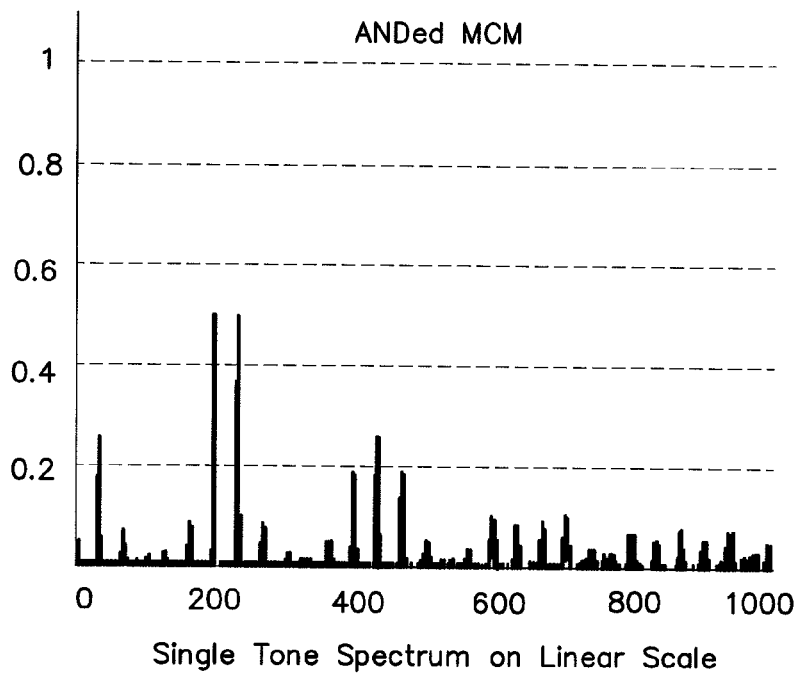
Figure 10D:
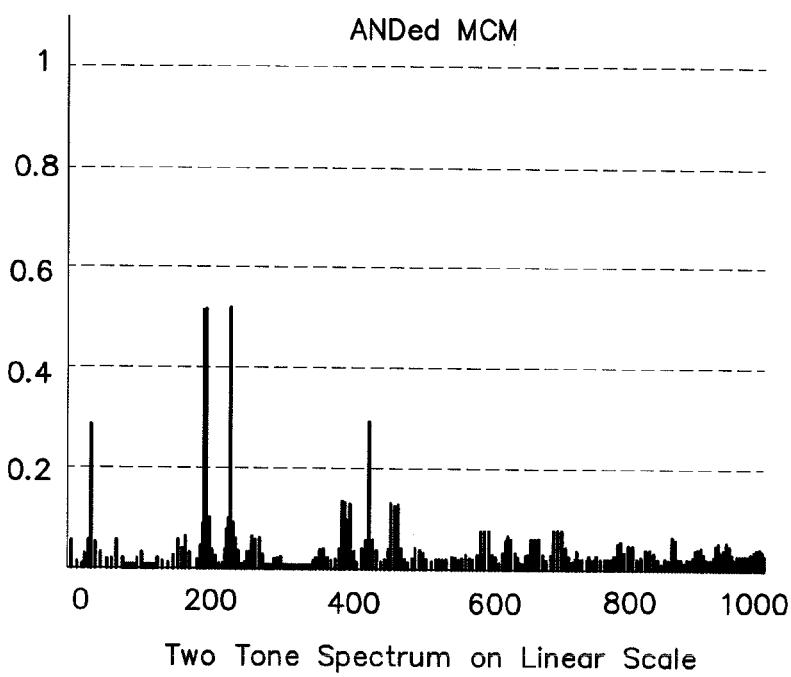
Figure 10E:
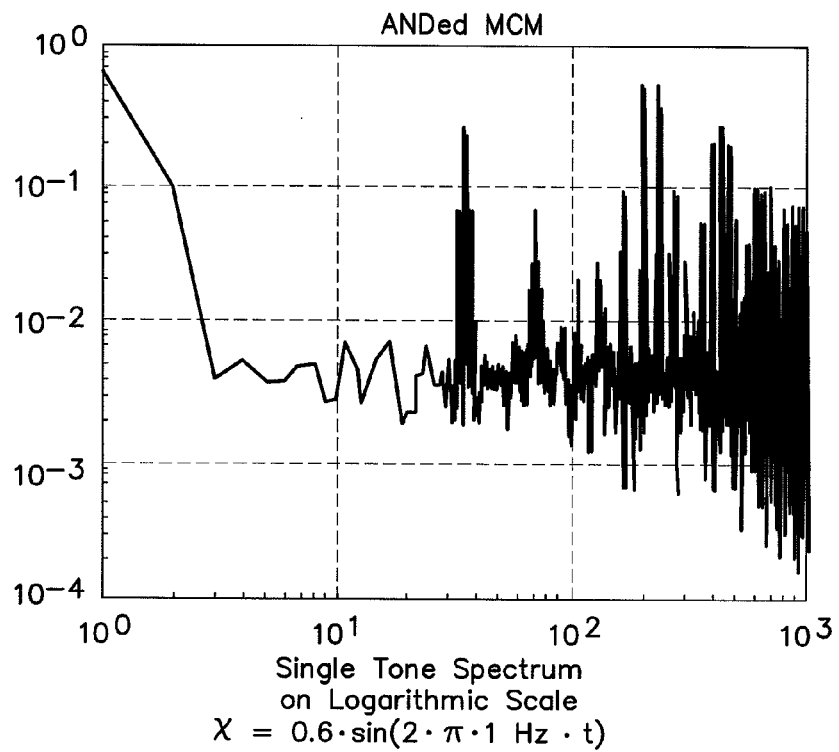
Figure 10F:
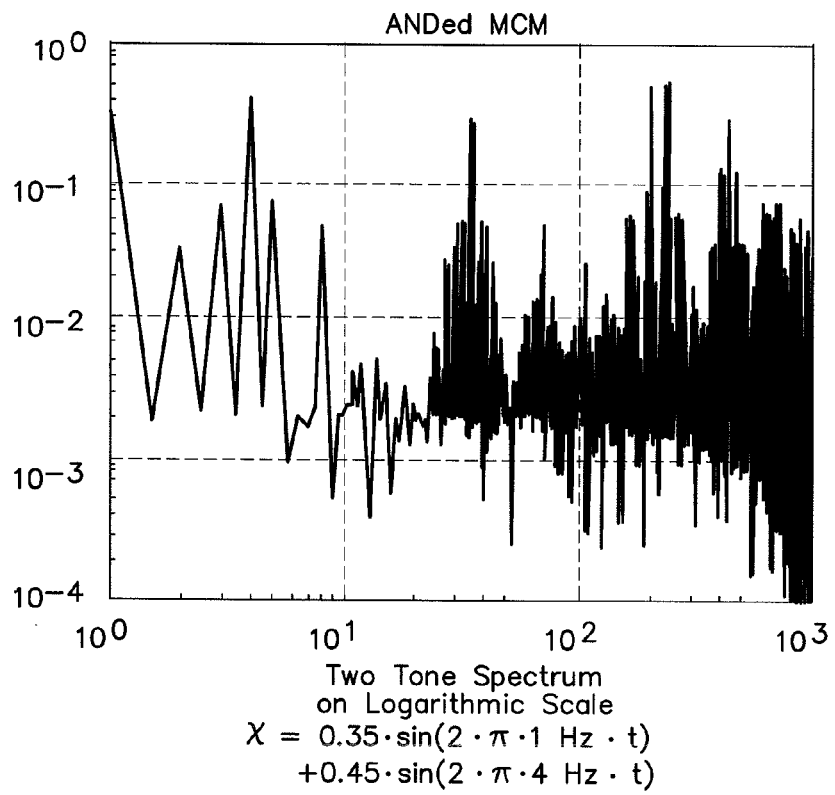

FIGS. 8A to 8F illustrate examples of waveforms and spectra in a single carrier modulation. FIG. 8A illustrates the waveforms of signals r, p and y for a sinusoidal stimulation r. FIG. 8C illustrates the spectrum of a waveform of signals p as illustrated in FIG. 8A on a linear frequency scale. FIG. 8E illustrates the spectrum of a waveform of signals p as illustrated in FIG. 8A on a logarithmic scale. FIG. 8B illustrates the waveforms of signals r, p and y for two superimposed sinusoidal stimulations of r. FIG. 8D illustrates the spectrum of a waveform p as illustrated in FIG. 8B on a linear frequency scale. FIG. 8F illustrates the spectrum of a waveform of signals p as illustrated in FIG. 8B on a logarithmic scale. In some examples, it may be desirable that no spectral component occur other than the reference signal r supplied to the modulator in the audio band, for example between 20 Hz and 20 kHz.

FIGS. 9 and 10 illustrate waveforms and spectra for ANDed and ORed multi carrier modulations, respectively. In the spectrum of the signal p that controls a transistor 19, the frequency of the reference signal r has the same amplitude as in a single carrier system. However, the amplitude of higher frequency components is reduced by half.

Figure 11:
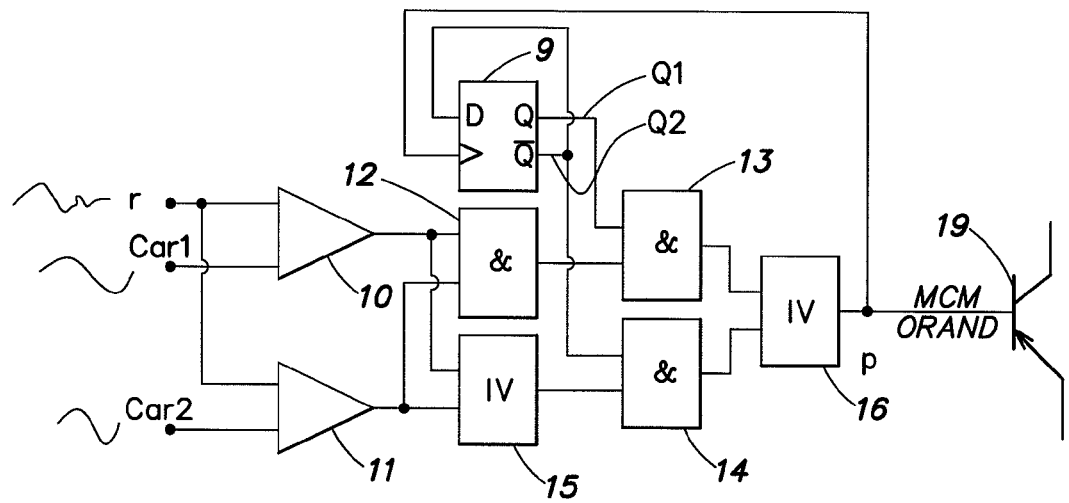
FIG. 11 is a block diagram illustration of a circuit arrangement that switches after each output pulse between ORed modulation and ANDed modulation.

Another approach to cancel the undesired DC effects of ORing and ANDing, as described above, is to switch after each resulting pulse between the ORed PWM result and the ANDed PWM result. An example of a circuit arrangement implementing the aforementioned technique is illustrated in FIG. 11. An MCM arrangement comprises comparators 10, 11 as modulators and standard AND gates 12, 13, 14 and OR gates 15, 16. The comparators 10, 11 each include two inputs and an output where the inputs of each comparator are supplied with the reference signal r and one of the carrier signals car1, car2, respectively. The outputs are fed into an OR gate and into an AND gate by gates 12 and 15.

The example in FIG. 11 further comprises a sampling element 9, having a clock input >, a data input D, an output Q1 and an inverted output Q2. The data input D of the sample element 9 is supplied with a signal from the inverted output Q2 of the sample element 9. The inputs of AND gate 13 are connected to the outputs of the sampling element 9 and the AND gate 12. The inputs of AND gate 14 are connected to the outputs of the sample element 9 and the OR gate 15. The inputs of OR gate 16 that provides the load signal y are connected to the outputs of the AND gates 13 and 14.

The sampling element 9, for example, a D-type flip-flop, alternately allows only one of the ORed PWM and the ANDed PWM to pass. For further lowering of high frequency peaks according to equation 2, ORing and ANDing PWMs can have multiple inputs coming from multiple comparators, where each input has its own carrier. In some examples, applying an OR-ANDed MCM causes the DC as well as the second order harmonic distortion THD2nd to vanish. However the OR-ANDed MCM may increase the third order harmonic distortion THD3rd. Additionally, the gain of such arrangement is higher than 1.

FIG. 12 illustrates examples of waveforms and spectra of the two-carrier modulation arrangement in FIG. 11. The high frequency peaks are suppressed and the intermodulation frequency is reduced to zero. The side bands have a distance from the carrier that is equal to the frequency of the reference signal r. OR-ANDed MCM can be used for switch-mode power supplies as well as amplifiers or any other kind of PWM driven application because there is no DC component in the spectrum. The intermodulations in the audio band (e.g., 20 Hz-20 kHz) resulting from, for example, two sinusoidal carrier signals are reduced so that this type of switch-power circuit can also be used in frequency converter applications, for example, to convert a 400 Hz aircraft power supply to a 50 Hz or 60 Hz in audio applications.

Figure 13:
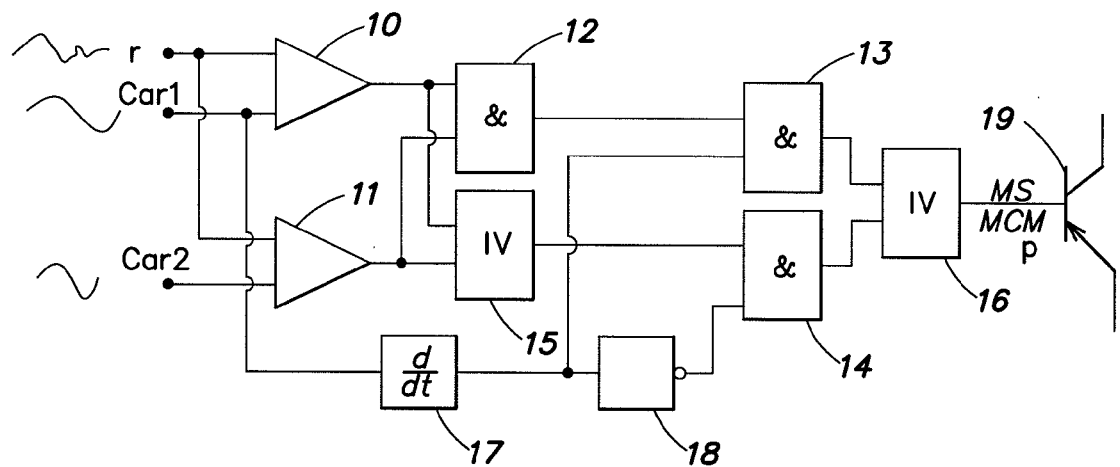
FIG. 13 is a block diagram illustration of a circuit arrangement that switches dependant on a master carrier.
Figure 12A:
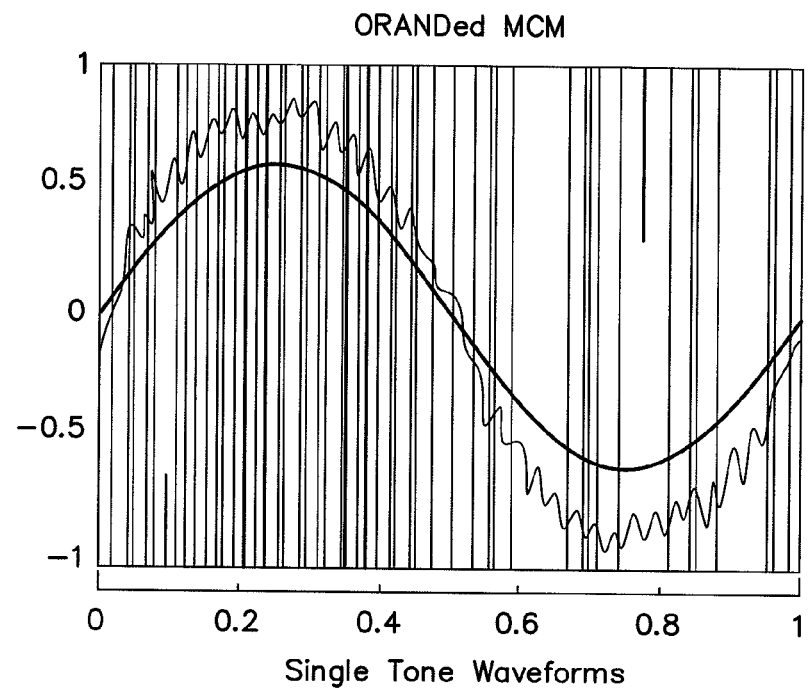
FIG. 12 shows waveforms and spectra of the two-carrier modulation arrangement of FIG. 11.
Figure 12B:
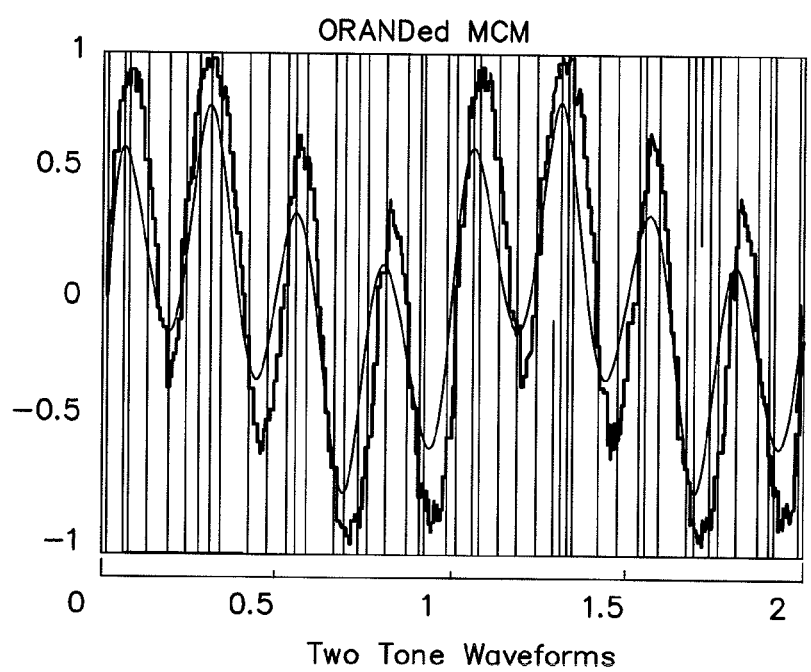
Figure 12C:
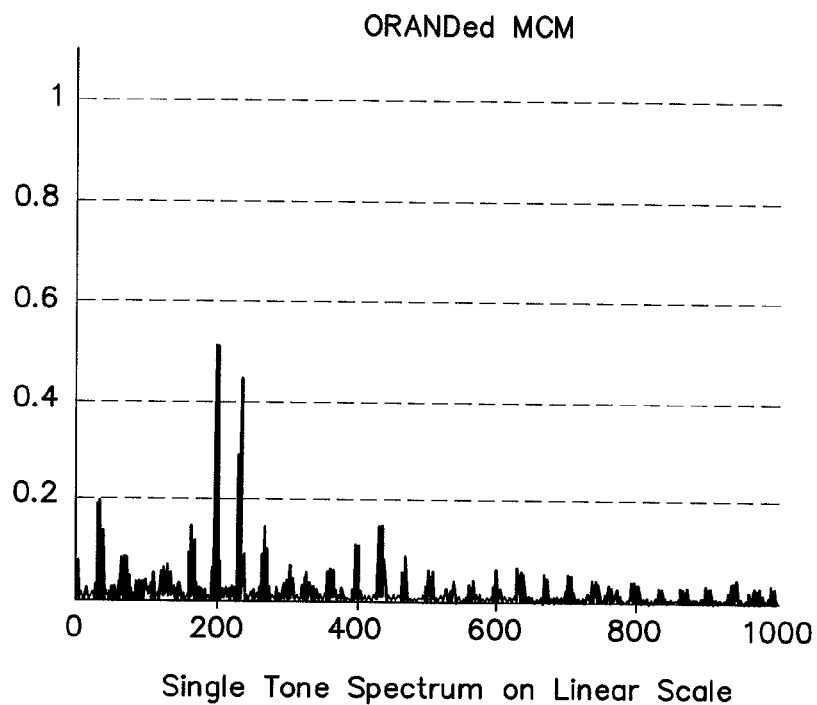
Figure 12D:
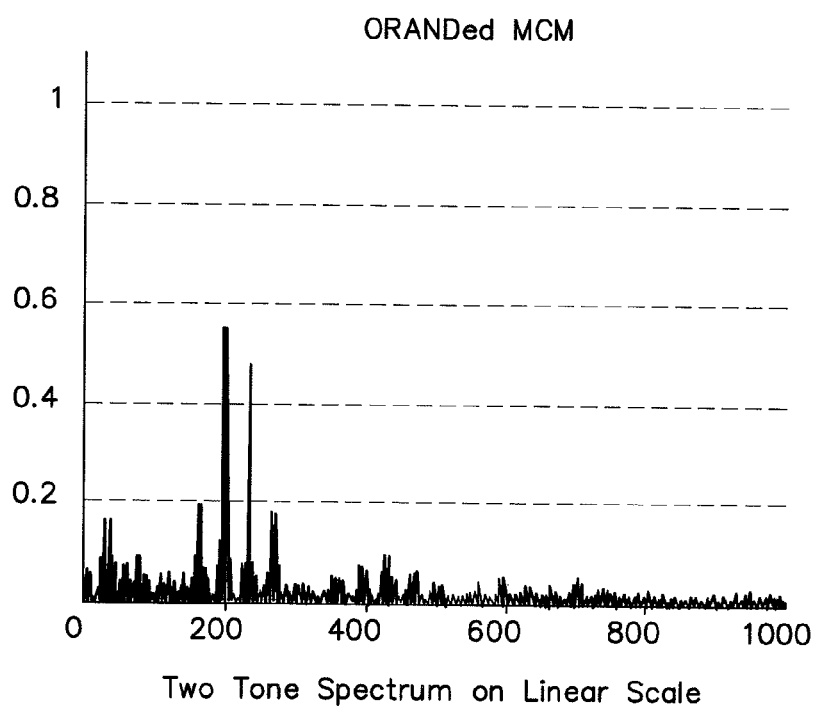
Figure 12E:
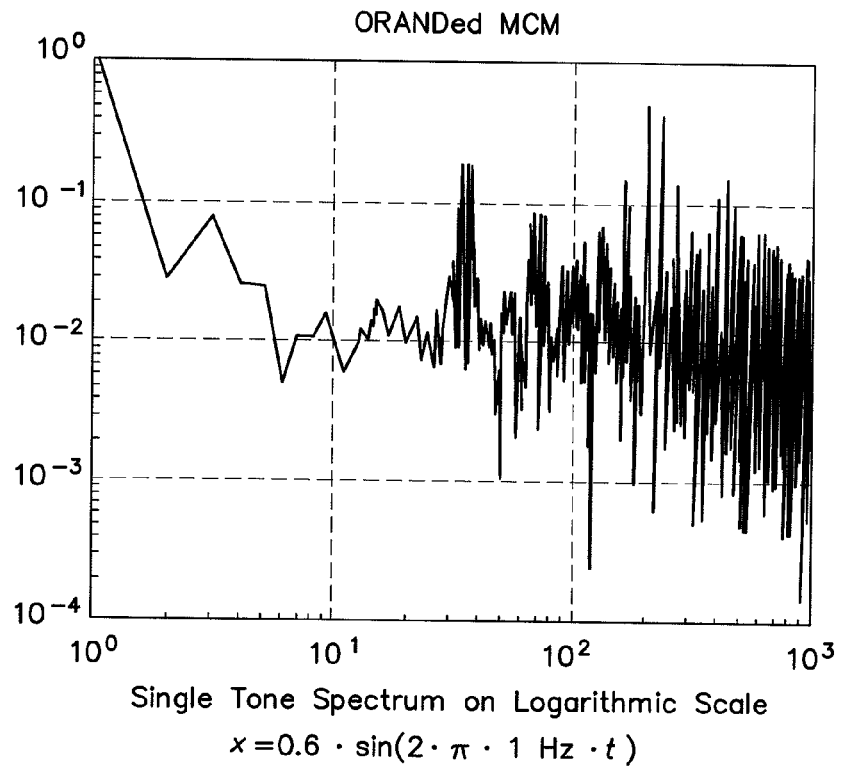
Figure 12F:
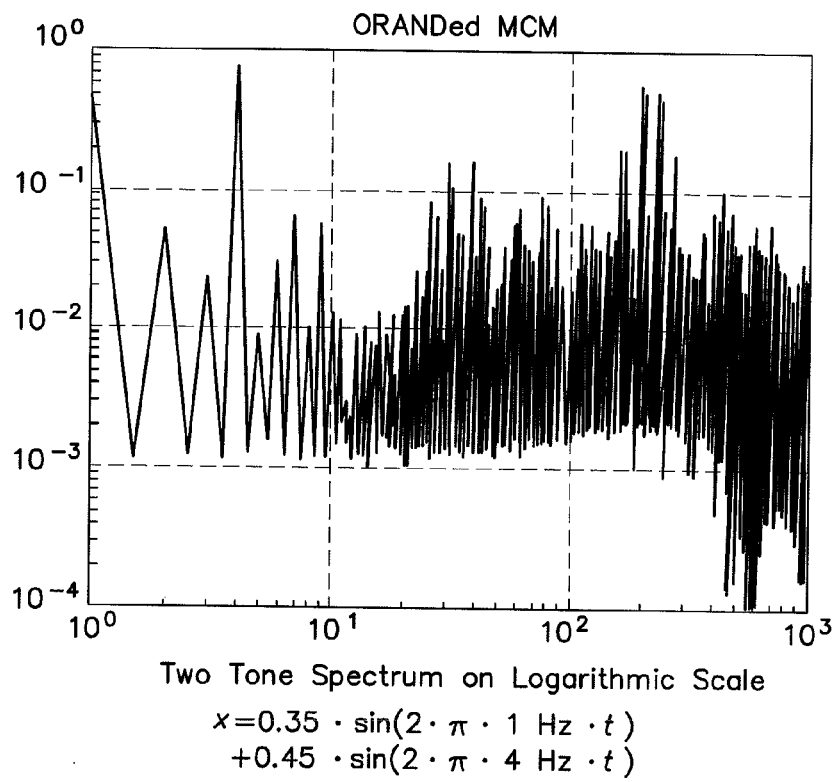
Figure 14A:
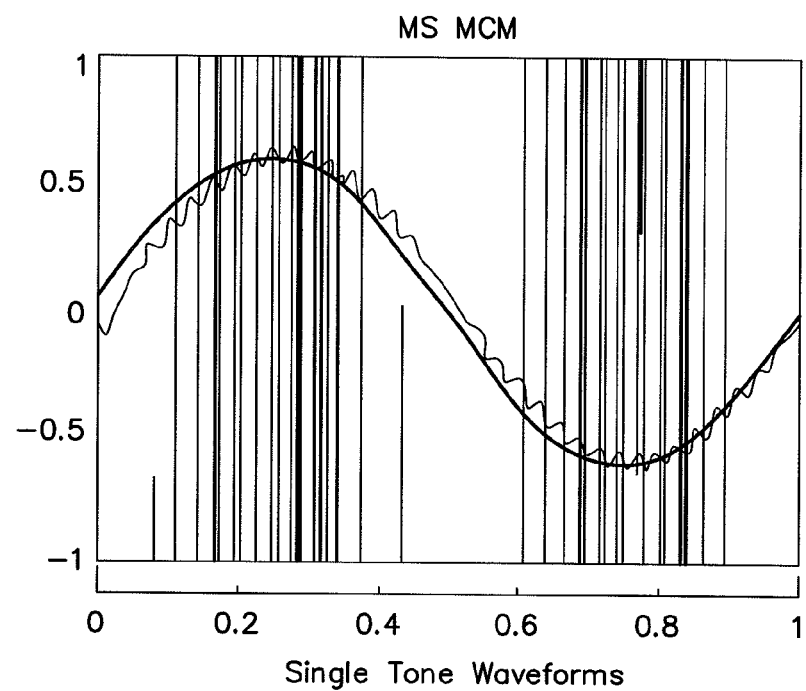
FIG. 14 shows waveforms and spectra of the two-carrier modulation arrangement of FIG. 13.
Figure 14B:
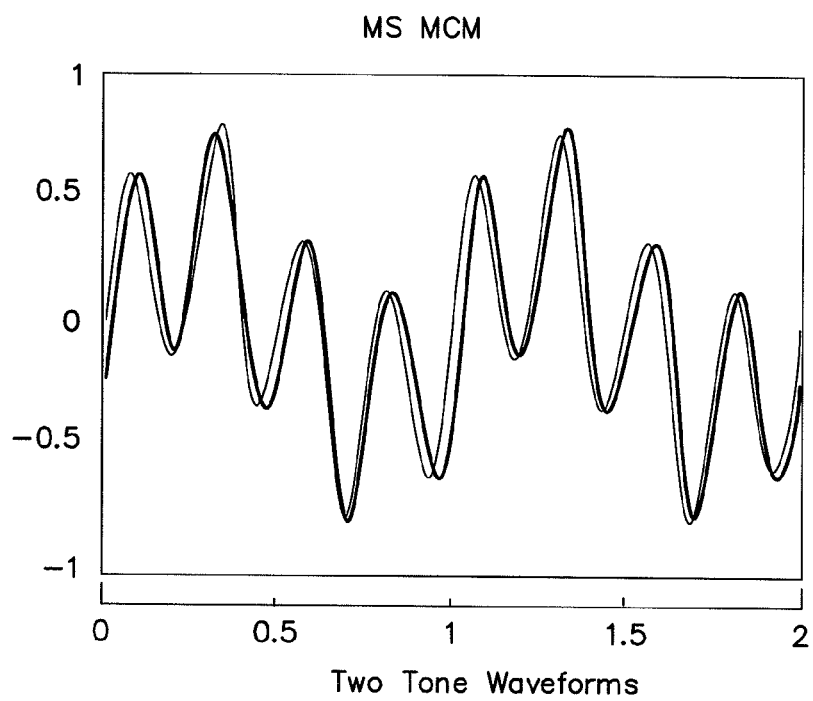
Figure 14C:
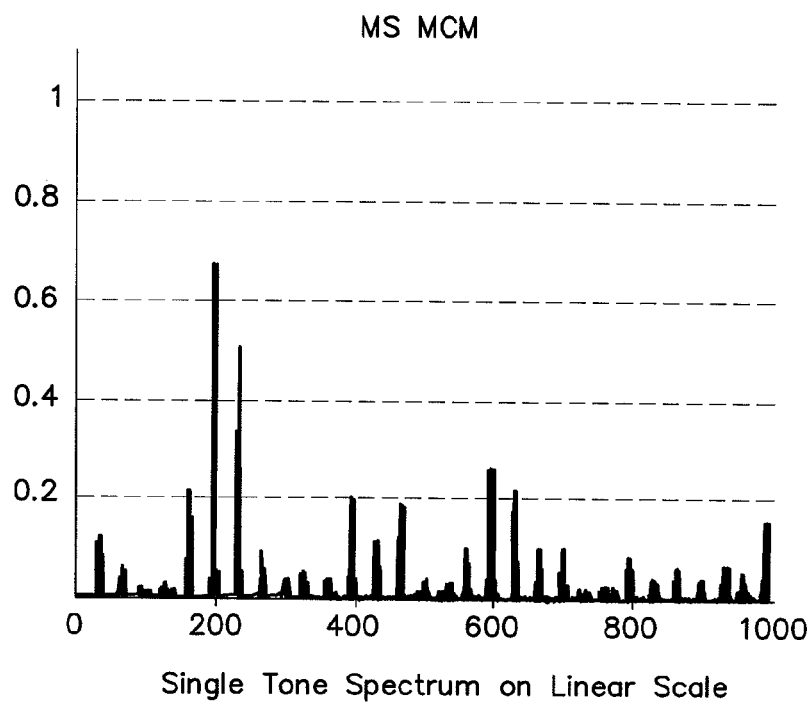
Figure 14D:
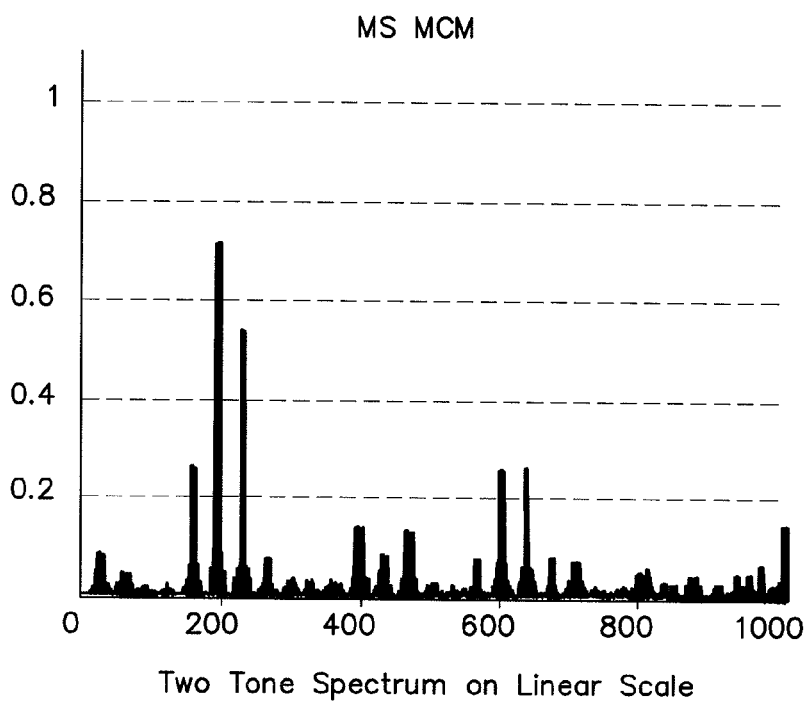
Figure 14E:
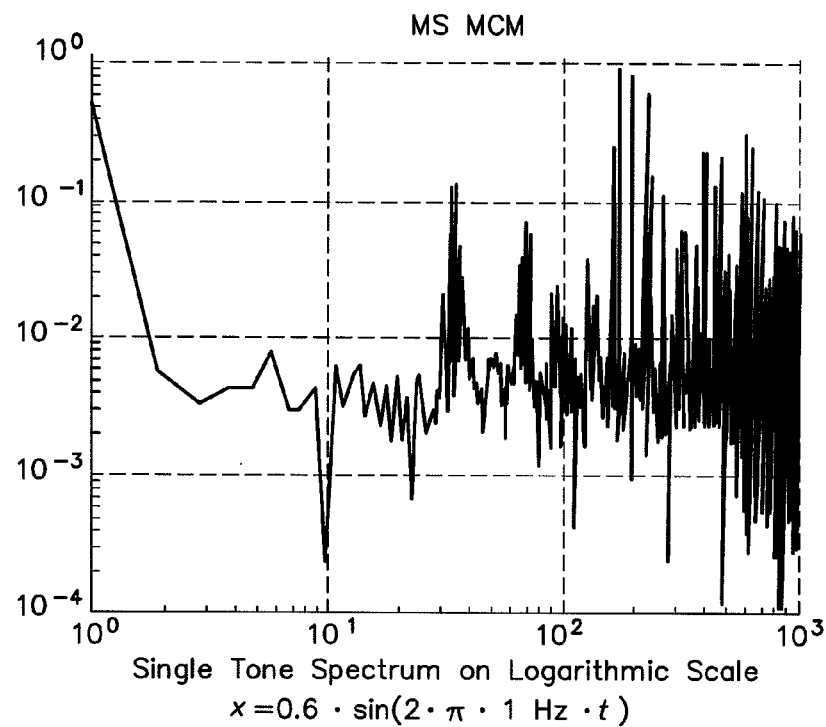
Figure 14F:
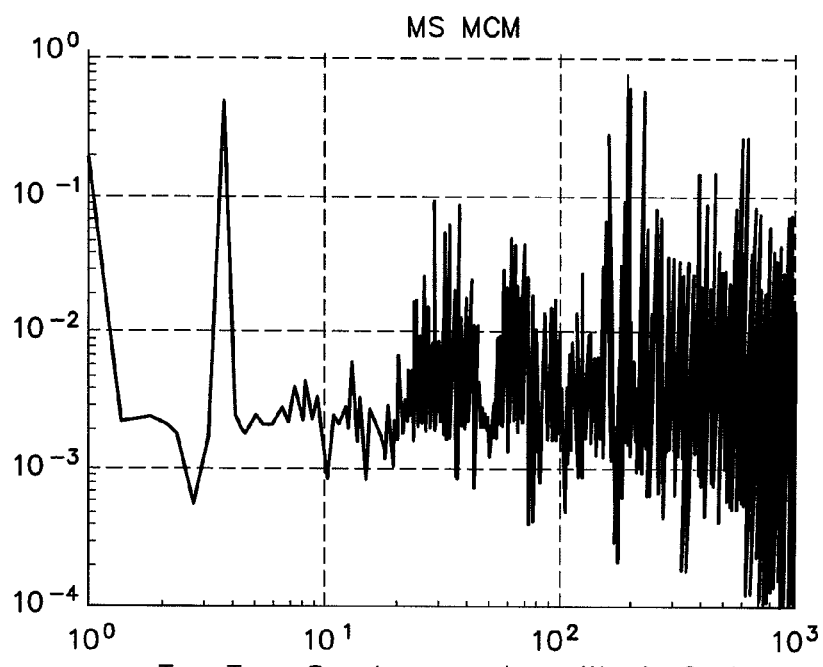

FIG. 13 illustrates an example of a Master-Slave (MS) MCM that includes a master carrier and one or more slave carriers where the slope of the master carrier determines whether the ORed MCM or the ANDed MCM is passed into the single bit stream forming the signal p. The arrangement in FIG. 13 differs from the arrangement illustrated in FIG. 11 in that the sample element is substituted by a differentiating element 17 that is supplied with carrier car1 (master carrier) and provides a differentiated signal to AND gate 13 and an inverted (by means of an inverter 18), differentiated signal to AND gate 14, via the inverter 18. In other examples, instead of differentiating the carrier signal car1, a differentiated carrier signal may be used that is supplied to the comparator 10 via an integrator. This arrangement allows for a very high linearity while still lowering the complete out-of-band spectrum as illustrated in FIG. 14. This arrangement is capable of driving any kind of PWM system, including high-class switch-mode, for example audio, power amplifiers and power supplies.

The multi-carrier modulation lowers the amplitude of the whole spectrum of a switch-mode modulator while keeping the in-band performance, uses more frequencies and is relatively easy to implement and therefore it saves cost, space, and complexity in switch-mode power circuits.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Instead of comparators, for example, multipliers or differential amplifiers may be used as modulators. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A circuit comprising:
   a controllable element that controls a load current in response to a control signal supplied to the controllable element; and
   a control unit that provides the control signal, the control unit comprising
   a first signal processing unit that receives a first carrier signal and an input signal, and provides a first output signal;
   a second signal processing unit that receives a second carrier signal and the input signal, and provides a second output signal; and
   a combiner unit that combines the first and the second output signals to form a signal representative of the control signal;
   where the first and the second carrier signals are different frequencies.

2. The circuit of claim 1, where the controllable element comprises a controllable switch configured to switch the load current on and off dependant on the control signal and where the combiner unit comprises a logic unit that combines the first and second output signals to form a binary signal representative of the control signal.

3. The circuit of claim 2, where the logic unit provides one of an OR operation, an AND operation and an OR-AND operation.

4. The circuit of claim 3, where
   the logic unit further comprises a first AND gate, a first OR gate and a second OR gate, each gate having at least two inputs and an output;
   the inputs of the first AND gate and the first OR gate are each coupled with the outputs of the first and the second signal processing units; and
   the outputs of the first AND gate and the first OR gate are coupled with the inputs of the second OR gate, the second OR gate having an output providing the control signal.

5. The circuit of claim 4, where
   one of the first and the second carrier signals is a master carrier signal having a slope; and
   the output of at least one of the first AND gate and the first OR gate provides the control signal that is a function of the slope of the master carrier signal.

6. The circuit of claim 4, where
   the logic unit further comprises a second AND gate and a third AND gate, each gate having two or more inputs and an output;
   the second AND gate is supplied with a differentiated master carrier element and the output of the first AND gate;
   the third AND gate is supplied with an inverted differentiated element and the output of the first OR gate; and
   the second OR gate is connected to the outputs of the second and the third AND gates, the second OR gate providing the control signal.

7. The circuit of claim 6, where the control signal further comprises alternating pulses from the first OR gate and the first AND gate.

8. The circuit of claim 7, where
   the logic unit further comprises a second AND gate, a third AND gate, and a sample element, each gate and the sample element having one or more inputs and an output;
   one input of the sample element is supplied with an inverted output signal of the sample element;
   the second AND gate is connected to the outputs of the sample element and the first AND gate;
   the third AND gate is connected to an inverted output of the sample element and the output of the first OR gate; and
   the second OR gate is connected to the outputs of the second and the third AND gates and provides the control signal.

9. The circuit of claim 2, where each of the first and the second signal processing units further comprise comparators, each comparator having inputs and an output, the inputs supplied with the input signal and one of the carrier signals.

10. The circuit of claim 2, where the first and the second signal processing units are adapted to generate pulse width modulated signals.

11. The circuit of claim 1, where the first and the second carrier signals comprise one of a rectangular, a sinusoidal, and a triangular waveform.

12. The circuit of claim 11, where the first and the second carrier signals are clock signals having a rectangular waveform.

13. The circuit of claim 1, where the controllable element comprises a transistor.

14. The circuit of claim 1, where the signal processing unit comprises a modulator.

* * * * *